United States Patent
Robinson et al.

(10) Patent No.: US 8,558,723 B2
(45) Date of Patent: Oct. 15, 2013

(54) UPDATING A KEYBOARD CONFIGURATION

(75) Inventors: Ian N. Robinson, Pebble Beach, CA (US); April Slayden Mitchell, San Jose, CA (US); Mark C. Solomon, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 12/897,467

(22) Filed: Oct. 4, 2010

(65) Prior Publication Data

US 2012/0081239 A1    Apr. 5, 2012

(51) Int. Cl.
*H03M 11/00*    (2006.01)

(52) U.S. Cl.
USPC ................. 341/23; 345/168; 341/22

(58) Field of Classification Search
USPC ...................... 341/20–23; 345/168
See application file for complete search history.

(56) References Cited

U.S. PATENT DOCUMENTS

| | | | |
|---|---|---|---|
| 566,048 A | 8/1997 | Miller | |
| 6,667,697 B2 | 12/2003 | Botich | |
| 7,688,310 B2 | 3/2010 | Rosenberg | |
| 2006/0238510 A1* | 10/2006 | Panotopoulos et al. | 345/168 |
| 2009/0174669 A1 | 7/2009 | Shkolnikov | |
| 2010/0089735 A1 | 4/2010 | Takeda et al. | |

FOREIGN PATENT DOCUMENTS

| | | |
|---|---|---|
| CN | 2904089 Y | 5/2007 |
| CN | 201174098 Y | 12/2008 |
| JP | 2009055250 A | 3/2009 |

OTHER PUBLICATIONS

Branscombe, Mary; "Blackberry Storm's Surprise Screen"; http://www.tomsguide.com/us/Blackberry-Storm-touch-screen,review-1146-4.html; Oct. 13, 2008.

* cited by examiner

*Primary Examiner* — Albert Wong

(57) ABSTRACT

Embodiments disclosed herein relate to updating a keyboard configuration. A keyboard configuration may be determined. The keys may be assigned a meaning based on the determined configuration where groups of adjacent keys are assigned the same meaning. An image for each of the keys may be determined based on the assigned meaning, and the determined image may be displayed on the keyboard keys.

15 Claims, 4 Drawing Sheets

UPDATING A KEYBOARD CONFIGURATION

BACKGROUND

Keyboards are often used to receive user input. For example, a user may respond to a software application, create a word processing document, or surf the Internet using a keyboard. A keyboard may communicate with a processor that then processes the user input and displays information related to the user input on a display, such as monitor. For example, a user may type a document on a keyboard, and the document may be displayed on monitor. Keyboards may include, for example, physically separated keys or electronically generated keys, such as on a touch screen.

BRIEF DESCRIPTION OF THE DRAWINGS

In the accompanying drawings, like numerals refer to like components or blocks. The drawings describe example embodiments. The following detailed description references the drawings, wherein.

DETAILED DESCRIPTION

Figure 1:
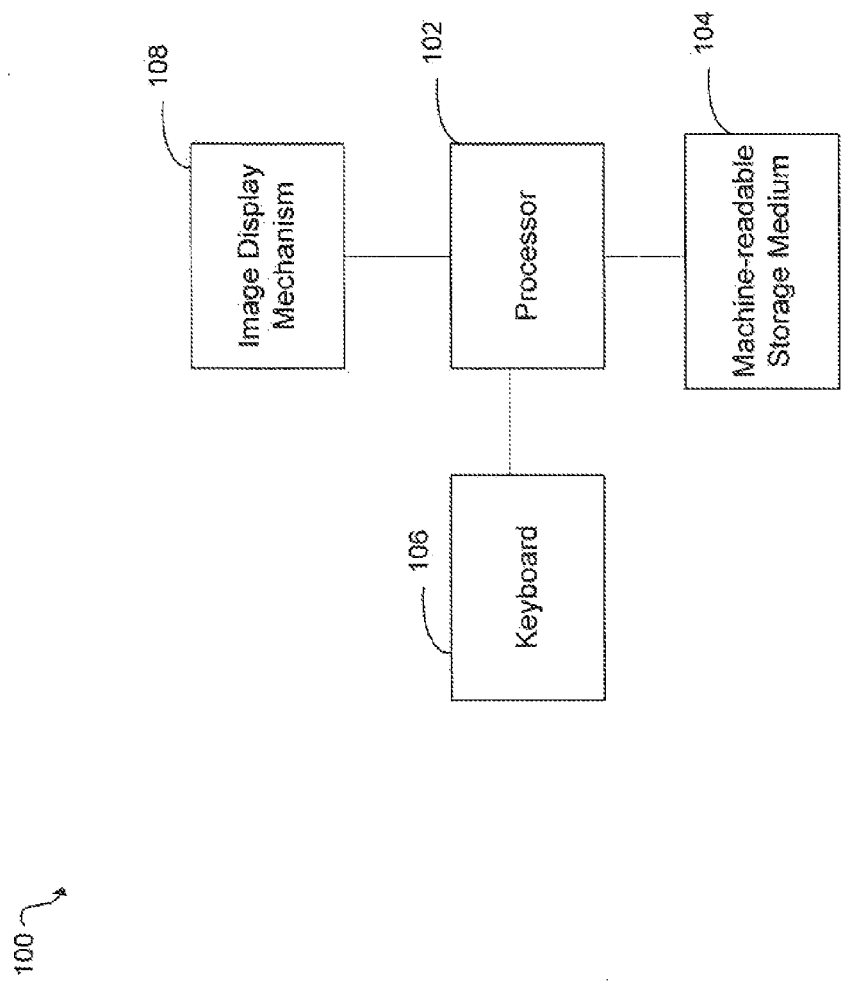
FIG. 1 is a block diagram illustrating an example of a computing system.

Keyboards may be used to receive user input. For example, a laptop or desktop computer may have an associated keyboard. In some cases, an electronic device for touch input may be attached to a physical keyboard to receive input. Keyboards may be used for multiple types of purposes, such as to type a document or play a computer game. A different keyboard or other input device may be connected to an electronic device for each of the desired uses, but this may be inconvenient or cumbersome in some circumstances. As an alternative, a keyboard may be mapped such that characters on a QWERTY keyboard have a different meaning, such as playing a video game using a letter key to make a character move forward. This approach, however, may be confusing to a user.

A virtual keyboard, such as a keyboard receiving input from a user touching a display, may be updated based on the software application being used. For example, the orientation of keys may be changed or the type of keys displayed may be changed. However, a virtual keyboard may not have physically distinct keys for providing haptic feedback. As a result, it may be more difficult for a user to account for which keys are being pushed. For example, a user may prefer a keyboard with physical keys for typing a document.

In some cases, images on a keyboard with physically separated keys are updated. For example, an Organic Light Emitting Diode (OLED) image may be displayed on the keys. However, the configuration in some cases may be limited to the physical setup of the keyboard. For example, the particular characters shown on a key may be changed, but the layout of the keys themselves may remain unchanged.

In one embodiment, the configuration of a keyboard with physically distinct keys may be updated. Updating the keys of a keyboard providing haptic feedback may be easier for a user to use than a virtual keyboard in some circumstances. For example, a user may feel a particular key being pushed and, as a result, may be better able to keep track which information has been input.

In one implementation, a keyboard includes smaller keys such that multiple keys may be mapped to a single character or input type and then remapped in a different grouping and to different characters. The keys may be assigned a meaning where keys next to each other may be grouped together. For example, the character 'A' may be shown across 4 keys, such that the four keys appear to be a single key. The physical keyboard keys may be the same in different configurations, but an updated image may be displayed on the keys, such as by a projector above the keys or a lighting mechanism below the key surface, to show the updated meaning of the keys. Using a keyboard with smaller keys that may be combined may allow for more versatile configurations than provided by updating images on a keyboard with a set number and pattern of keys.

In one implementation, images on the keys are updated such that different keys are assigned different characters or meanings in different configurations. Updating the configuration of a keyboard may allow the same keyboard to be used for different purposes. For example, a keyboard may be used for typing a document, playing a game, or playing a musical instrument. A keyboard may be placed in a different configuration, for example, such that two of four keys associated with an 'A' character are changed to together display an arrow for providing user input to a graphics software program.

FIG. 1 is a block diagram illustrating one example of a computing system 100. The computing system 100 may include, for example, a processor 102, a machine-readable storage medium 104, a keyboard 106, and an image display mechanism 108.

The keyboard 106 may be any suitable keyboard. For example, the keyboard 106 may include smaller keys such that multiple keys may be mapped to a character or other input. For example, an image may be displayed on adjacent keys such that they appear as if they are a single key. The keys may be physically differentiated keys providing haptic feedback such that a key feels as if it depresses when pressed. The keys may be raised, for example, with space between the keys where each individual key lowers when pressed.

Figure 2:
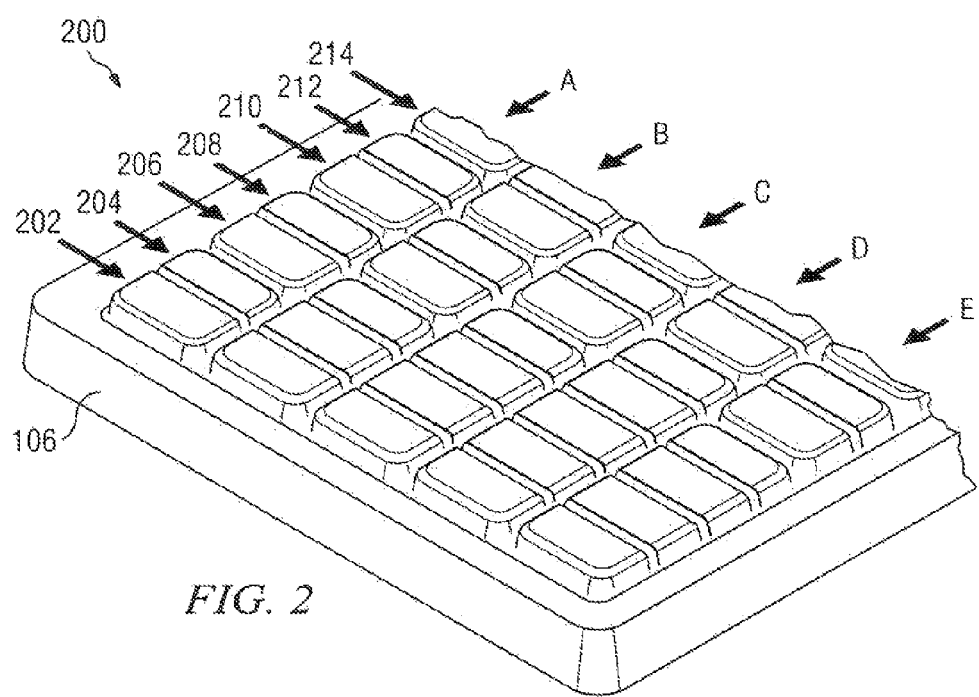
FIG. 2 is a diagram illustrating an example of a keyboard.

FIG. 2 is a diagram illustrating an example 200 of the keyboard 106. For example, FIG. 2 shows multiple smaller keys on the keyboard 106. Keys are shown in rows A, B, C, D, and E in columns 202, 204, 206, 208, 210, 212, and 214. In one implementation, the keys form a grid or other design. The keys may be grouped together. For example, keys in columns 202 and 204 of row A may be combined to create a letter key for 'Q'. As another example, a key in column 202 of row A may display a 'Q' character, and a key in column 204 of row A may display a 'W' character.

In one implementation, the keyboard 106 has finger depressions related to a particular configuration. For example, a keyboard may have finger depressions related to a QWERTY keyboard to make the keys combined for a single letter key feel more like a single key. For example, if the keys in columns 202 and 204 of row A on the keyboard 106 are assigned to a 'Q' character, there may be a half circle depression on the right side of the key in column 202 row A and a half circle depression on the left side of the key in column 204 row A such that together they form a circular depression for a finger. The finger depressions may remain the same if the keyboard is updated to a different configuration.

In one implementation, a portion of the keyboard 106 may be updated and another portion has a set configuration. For example, the keyboard 106 may include a typical QWERTY keyboard along with a set of keys that can be altered based on the use of the keyboard 106. As an example, the keyboard 106 may include a QWERTY keyboard where the F1-F12 keys may be smaller keys that may have different meanings and images.

Referring back to FIG. 1, the image display mechanism 108 may be any suitable image display mechanism for displaying an image on the keys of the keyboard 106. For example, the image display mechanism 108 may be a projector that projects an image on the keys of the keyboard 106. The image display mechanism 108 may be in any suitable position relative to the keyboard 106. For example, the image display mechanism 108 may be attached to the keyboard 106 or another portion of an electronic device associated with the keyboard 106, such as a monitor or electronic device case. The image display mechanism 108 may be a projector mounted above the keyboard 106, such as docked with a monitor or other display associated with the keyboard 106. The image display mechanism 108 may be independent of the keyboard 106, such as a separate portable device. For example, the image display mechanism 108 may be a handheld projector.

In one implementation, the image display mechanism 108 is an electronic paper display below the surface of the keys of the keyboard 106. For example, the electronic paper may display updated characters or images in electronic ink. Using electronic paper may allow the keys to be updated using lower power consumption and may provide a more natural looking image.

In one implementation, the image display mechanism 108 is a lighting mechanism, such as an Organic Light Emitting Diode (OLED) associated with the keyboard 106 providing an image from below the keyboard 106 keys to display an image on the keys. For example, the image display mechanism 108 may provide a light underneath of or to the side of the keys of the keyboard 106 to make an image appear on them.

In one implementation, the keys on the keyboard 106 are blank so that other images may be shown on them. In one implementation, the keys have symbols written on them. For example, the keyboard 106 keys may have QWERTY symbols printed on them in low contrast so that any images projected on the keys may be more prominent. This may allow, for example, the keyboard 106 to be used as a QWERTY keyboard without the image display mechanism 108 being activated, such as if the keyboard 106 is undocked from a projection system.

The processor 102 may be any suitable processor. For example, the processor 102 may be one or more central processing units (CPUs), semiconductor-based microprocessors, and/or other devices suitable for retrieval and execution of instructions stored in machine-readable storage medium 104. The processor 102 may fetch, decode, and execute instructions stored in the machine-readable storage medium 104 to implement the functionality described in detail below. As an alternative or in addition to fetching, decoding, and executing instructions, the processor 102 may include one or more integrated circuits (ICs) or other electronic circuits that comprise a plurality of electronic components for performing the functionality described below. The processor 102 may be included within the keyboard 106 or separately from the keyboard 106. For example, the processor 102 may be included within an electronic device using the keyboard 106 as an input device. In one implementation, the processor 102 runs applications on an electronic device. For example, the processor 102 may receive input from the keyboard 106, process the input, and display data related to the input on a display, such as a monitor.

The machine-readable storage medium 104 may be any electronic, magnetic, optical, or other physical storage device that stores executable instructions or other data (e.g., a hard disk drive, random access memory, flash memory, etc.). The machine-readable storage medium 104 may include instructions executable by the processor 102, for example, instructions to determine a layout of the keyboard 106, assign a meaning to each of the keys on the keyboard 106 based on the determined layout, where a collection of adjacent keys are given the same meaning, and determine an image to display on each of the keys based on the assigned meaning, where the image on the collection of keys assigned the same meaning indicates that the keys are grouped together. The machine-readable storage medium 104 may further include instructions to display the determined image on each of the keys, such as by sending instructions to the image display mechanism 108.

Figure 3:
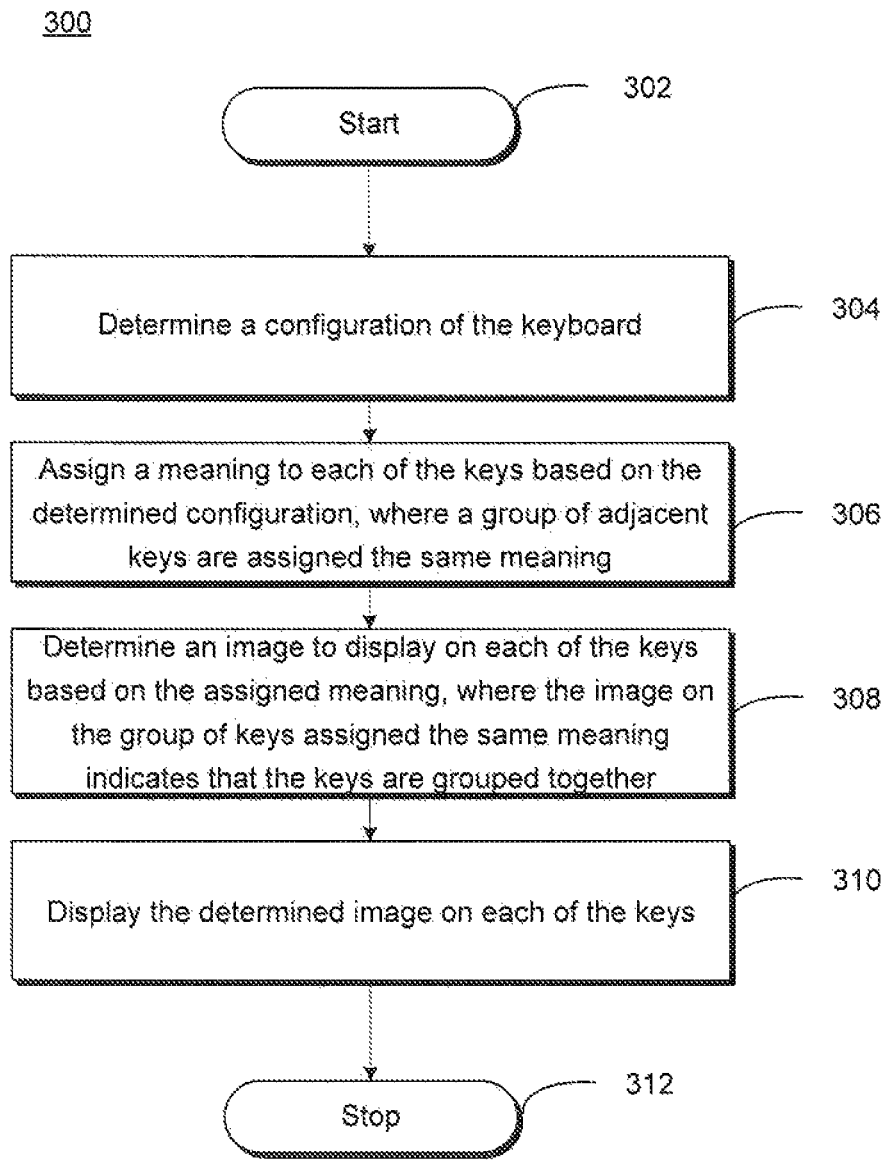
FIG. 3 is a flow chart illustrating an example of a method for updating a keyboard configuration.

FIG. 3 is a flow chart illustrating one example of a method 300 for updating a keyboard configuration. For example, the processor 102 may determine a configuration of the keyboard 106, such as based on how the keyboard 106 is being used. The processor 102 may assign a meaning to each of the keys on the keyboard 106. In some cases, multiple adjacent keys may be assigned the same meaning, such as four keys assigned to each letter character in a QWERTY keyboard configuration. The processor 102 may determine an image to be displayed on each of the keys based on the assigned meaning. For example, if four keys are assigned to correspond to the character 'A', the processor 102 may determine an image to be displayed on each of the four keys such that together an 'A' appears to be shown across the four keys. The processor 102 may instruct the image display mechanism 108 to display the determined image on each of the keys of the keyboard 106. As a result, the keyboard 106 may appear to have an updated configuration.

Beginning at block 302 and moving to block 304, the processor 102, such as by executing instructions stored in the machine-readable storage medium 104, determines a configuration of the keyboard 106. The determined configuration may be any suitable layout of the keyboard 106. The processor 102 may determine a keyboard configuration in any suitable manner, such as based on information received from a user or electronic device about a particular configuration or based on the use of the keyboard 106. The processor 102 may determine the configuration based on an application executing on the processor 102. For example, if the processor 102 is executing a word processing program, the processor 102 may determine that a QWERTY keyboard configuration should be selected. If the processor 102 is executing a game X, the processor 102 may determine that a keyboard configuration with controls suited to game X should be displayed, and if the processor 102 is executing a game Y, the processor 102 may determine that a keyboard configuration with controls suited to game Y should be displayed. In one implementation, the processor 102 may determine a configuration based on a particular software program being used. For examples, options that may be displayed on a drop down menu on a display may be shown as a symbol or icon on a key or group of keys on the keyboard 106.

Moving to block 306, the processor 102, such as by executing instructions stored in the machine-readable storage medium 104, assigns a meaning to each of the keys based on the determined configuration, where a group of adjacent keys are assigned the same meaning. For example, for a conventional QWERTY keyboard, a collection of two or more physical keys on the keyboard 106 may be assigned to each character. The keys may be regrouped and assigned to a different character or image for a different keyboard configuration. For example, the keys in column 202 row A and column 204 row A of the keyboard 106 shown in FIG. 2 may be assigned a 'Q' character in a QWERTY keyboard. In some implementations, some of the keys are grouped together and some of the keys are assigned an individual meaning. For example, the processor 102 may determine that a game application is running, and the processor 102 may determine that the key in column 204 of row A should be updated to show an icon of a character jumping.

In one implementation, pressing any of the keys assigned to a particular meaning triggers the particular meaning. For example, if two keys are associated with an 'S' character, pressing either key may indicate that an 'S' was pressed. In one implementation, more than one of the keys assigned to a particular meaning are pressed to trigger the assigned meaning. For example, the processor 102 may determine that an 'S' key is not selected if one of two keys associated with an 'S' is pressed, and may determine that an 'S' key is selected if both of the keys associated with an 'S' are pressed.

In one implementation, the processor 102 assigns or provides haptic feedback based on the assigned meaning. For example, the keys of the keyboard 106 that are assigned the same meaning may feel as if a person pressed a distinct key rather than multiple keys. For example, pressing one key associated with a meaning may cause other keys associated with the same meaning to also depress. In one implementation, the type of haptic feedback is altered based on the meaning. For example, a key may feel depressed or may vibrate when pressed, depending on the assigned meaning.

Continuing to block 308, the processor 102, such as by executing instructions stored in the machine-readable storage medium 104, determines an image to display on each of the keys based on the assigned meaning, where the image on the group of keys assigned the same meaning indicates that the keys are grouped together. The processor 102 may determine, for example, a design or color to be displayed on each of the keys of the keyboard 106 to reflect the assigned meaning. For example, if the processor 102 determines that an upward arrow should be displayed across the keys in column 208 of row B and row C, the processor 102 may determine that the rectangular portion of the arrow should be displayed on the key in column 208 row C and the triangular portion of the arrow should be displayed on the key in column 208 row B. The processor 102 may determine that the arrow should be displayed on the key in column. 208 of row C and may show a color or shading across the keys in column 208 of row B and row C to indicate that the keys are combined.

Proceeding to block 310, the processor 102, such as by executing instructions stored in the machine-readable storage medium 104, displays the determined image on each of the keys. The processor 102 may display the determined image in any suitable manner, such as by instructing the image display mechanism 108. For example, the processor 102 may directly send an instruction to the image display mechanism 108 or may send information to the image display mechanism 108 via a network, such as using Bluetooth®. For example, the processor 102 may be associated with an electronic device using the keyboard 106 for input. The processor 102 may be located outside of the keyboard 106 and may send the instructions to the keyboard 106 via a network. The image display mechanism 108 may display the determined image on the keys. For example, the image display mechanism 108 may project the determine image on the keys. In one implementation, the image display mechanism 108 produces an image below the surface of the keys.

In one implementation, the configuration of the keyboard 106 may be updated. For example, the processor 102 may determine an electronic device associated with the keyboard 106 is being used for another purpose, such as with a different software application. The processor 102 may then determine an updated configuration based on the new use of the keyboard 106. For example, the keyboard 106 may be in a QWERTY keyboard configuration, and the processor 102 may update the configuration so that it is in a configuration better suited for a graphical application. The method then continues to block 312 to end.

Figure 4:
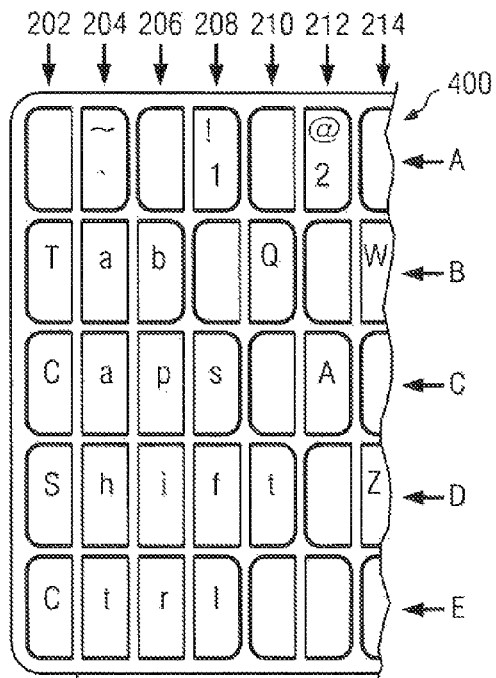
FIG. 4 is a diagram illustrating an example of a keyboard configuration.
Figure 5:
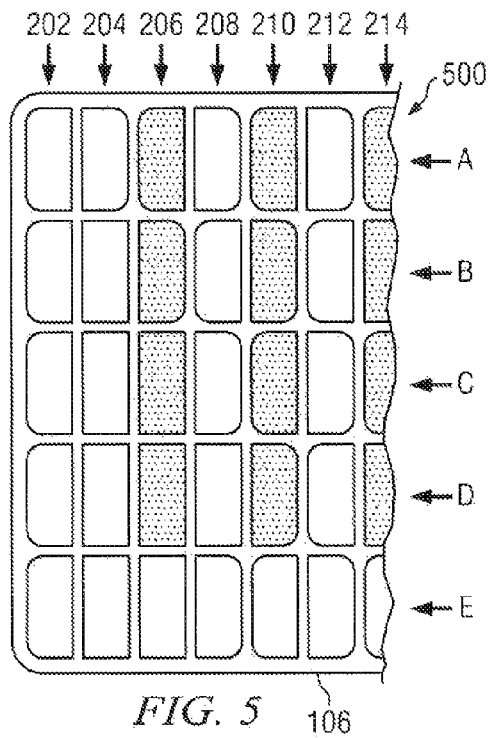
FIG. 5 is a diagram illustrating an example of a keyboard configuration.
Figure 6:
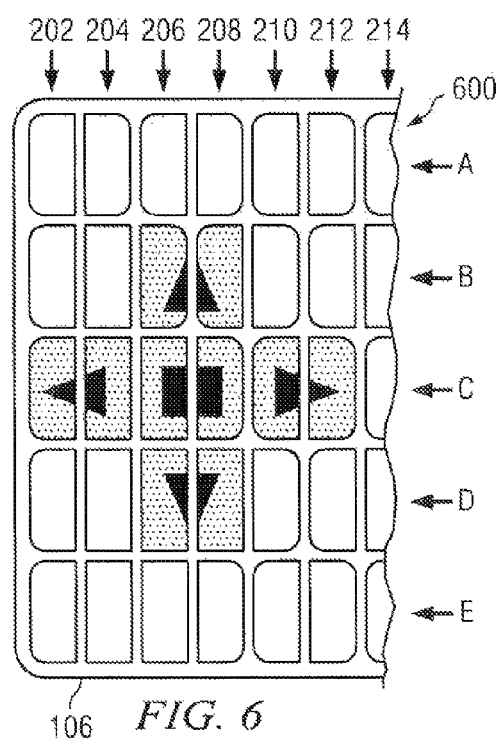
FIG. 6 is a diagram illustrating an example of a keyboard configuration.

The keyboard 106 may be placed in any suitable configuration. FIGS. 4-6 show example configurations of the keyboard 106. Other configurations in addition to those shown in FIGS. 4-6 are also contemplated.

FIG. 4 is a diagram illustrating one example of a configuration 400 of the keyboard 106 shown in FIGS. 1 and 2. The keyboard 106 may be in a configuration displaying alphanumeric characters, for example, for use for typing a document. For example, the configuration 400 may be a QWERTY keyboard. Row B shows keys combined to form a 'tab', 'Q', and 'W' key.

FIG. 5 is a diagram illustrating one example of a configuration 500 of the keyboard 106. The configuration of the keyboard 106 may be updated for a particular application, such as a music software program. The configuration 500 shows the keys in column 206 in rows A, B, C, and D and column 210 rows A, B, C, and D darkened as black keys on a piano. Columns 202, 204, 208, and 212 show white piano keys. Pressing any of the keys of the keyboard 106 associated with a particular note on a piano may result in the same musical sound. For example, pressing the key in column 206 row C or D may have the same effect similar to pressing a piano key on a different area of the key. The configuration 500 may allow a user to compose a song using the keyboard 106 rather than a keyboard specifically tailored to a piano application or a digital piano keyboard input device.

FIG. 6 is a diagram illustrating one example of a configuration 600 of the keyboard 106. The configuration of the keyboard 106 may be updated as a game console for playing a computer game. For example, the configuration 600 shows the keyboard 106 with keys in columns 206 and 208 in row B as an up arrow, keys in columns 210 and 212 in row C as a left arrow, keys in columns 206 and 208 in row D as a down arrow, keys in columns 202 and 204 in row C as a left arrow, and keys in columns 206 and 208 in row C as a stop button. The image on the stop key, for example, is shown across columns 206 and 208 of row C such that the two keys appear to be a single key.

Updating the configuration of a keyboard may allow multiple uses of the same keyboard. A keyboard with smaller keys allows for more versatile keyboard configurations on a keyboard while maintaining physically differentiated keys. For example, a keyboard configuration may be updated to better tailor it for writing a document, playing a game, or composing a song.

The invention claimed is:

1. A computing system, comprising:
   a keyboard to receive user input comprising a determinate set of a fixed number of depressible mechanical keys that are physically differentiated from one another;
   an image display mechanism displaying an image on the keyboard keys;

a processor to:
   determine a first configuration of the keyboard;
   assign respective meanings in a first set to the keys based on the determined first configuration, wherein a respective one of the meanings in the first set is assigned to a first group of adjacent keys;
   determine a first set of images to display on respective ones of the keys based on the assigned meanings, wherein the image displayed on the first group of keys indicates that the keys in the first group are grouped together;
   display the first set of images on the keys using the image display mechanism;
   ascertain a second configuration of the keyboard;
   re-assign respective meanings in a second set to the keys based on the ascertained second configuration, wherein a respective one of the meanings in the second set is assigned to a second group of adjacent keys;
   determine a second set of images to display on respective ones of the keys based on the re-assigned meanings, wherein the image displayed on the second group of keys indicates that the keys in the second group are grouped together;
   display the second set of images on the keys using the image display mechanism.

2. The computing system of claim 1, wherein determining a configuration of the keyboard is based on the use of the keyboard.

3. The computing system of claim 1, wherein the image display mechanism comprises a projector for projecting an image on the keyboard keys.

4. The computing system of claim 1, wherein the image display mechanism comprises a lighting mechanism associated with the keyboard providing light below the keyboard keys surface to display an image on the keys.

5. The computing system of claim 1, wherein the processor further provides haptic feedback based on the determined configuration.

6. A method, comprising by a processor:
   determining a first configuration of a keyboard comprising a determinate set of a fixed number of depressible mechanical keys that are physically differentiated from one another;
   assigning respective meanings in a first set to the keys based on the determined first configuration, wherein a respective one of the meanings in the first set is assigned to a first group of adjacent keys;
   determining a first set of images to display on respective ones of the keys based on the assigned meanings, wherein the image displayed on the first group of keys indicates that the keys in the first group are grouped together;
   displaying first set of images on the keys using the image display mechanism;
   ascertaining a second configuration of the keyboard;
   re-assigning respective meanings in a second set to the keys based on the ascertained second configuration, wherein a respective one of the meanings in the second set is assigned to a second group of adjacent keys;
   determining a second set of images to display on respective ones of the keys based on the re-assigned meanings, wherein the image displayed on the second group of keys indicates that the keys in the second group are grouped together;
   displaying the second set of images on the keys using the image display mechanism.

7. The method of claim 6, wherein determining a configuration of the keyboard comprises determining a configuration of the keyboard based on the use of the keyboard.

8. The method of claim 6, wherein displaying the determined image on each of the keys comprises instructing a projector to project the determine image on each of the keys.

9. The method of claim 6, wherein displaying the determined image on each of the keys comprises providing a lighted image below the surface of the keyboard keys to display the determined image on each of the keys.

10. The method of claim 6, wherein the determined configuration comprises a gaming console.

11. A machine-readable storage medium encoded with instructions executable by a processor, the machine-readable medium comprising instructions to:
   determine a first layout of a keyboard comprising a determinate set of a fixed number of depressible mechanical keys that are physically differentiated from one another;
   assign respective meanings in a first set to the keys based on the determined first layout, wherein a respective one of the meanings in the first set is assigned to a first collection of adjacent keys;
   determine a first set of images to display on respective ones of the keys based on the assigned meanings, wherein the image displayed on the first collection of keys indicates that the keys in the first collection are grouped together;
   display the first set of images on the keys;
   ascertain a second layout of the keyboard;
   re-assign respective meanings in a second set to the keys based on the ascertained second layout wherein a respective one of the meanings in the second set is assined to a second collection of adjacent keys;
   determine a second set of images to display on respective ones of the keys based on the re-assigned meanings, wherein the image displayed on the second collection of keys indicates that the keys in the second collection are grouped together;
   display the second set of images on the keys.

12. The machine-readable storage medium of claim 11, wherein instructions to determine a layout of the keyboard comprises instructions to determine a layout of the keyboard based on the use of the keyboard.

13. The machine-readable storage medium of claim 11, further comprising instructions to provide haptic feedback based on the determined layout.

14. The machine-readable storage medium of claim 11, wherein the determined configuration comprises alphanumeric characters displayed on the keys.

15. The machine-readable storage medium of claim 11, further comprising instructions to update the determined layout.

* * * * *

UNITED STATES PATENT AND TRADEMARK OFFICE
CERTIFICATE OF CORRECTION

| | | |
|---|---|---|
| PATENT NO. | : 8,558,723 B2 | Page 1 of 1 |
| APPLICATION NO. | : 12/897467 | |
| DATED | : October 15, 2013 | |
| INVENTOR(S) | : Ian N. Robinson et al. | |

It is certified that error appears in the above-identified patent and that said Letters Patent is hereby corrected as shown below:

In the Claims:

In column 8, line 37, in Claim 11, delete "layout" and insert -- layout, --, therefor.

In column 8, lines 38-39, in Claim 11, delete "assi ned" and insert -- assigned --, therefor.

Signed and Sealed this
Seventeenth Day of December, 2013

Margaret A. Focarino
*Commissioner for Patents of the United States Patent and Trademark Office*